Patented Jan. 15, 1946

2,392,995

UNITED STATES PATENT OFFICE 2,392,995

COMPOSITION

Gerald C. North, Alvin J. Alton, and Lawrence Little, Chicago, Ill., assignors to Beatrice Creamery Company, Chicago, Ill., a corporation of Delaware No Drawing. Application November 16, 1943, Serial No. 510,544

1 Claim. (Cl. 99—123)

This invention relates to a dry powdered shortening which is particularly useful in the manufacture of baked goods.

The primary object of the invention is to provide a free-flowing, non-greasy product for inclusion in a suitably prepared mix containing flour and other usual ingredients of such mixes which product contributes in producing baked goods having improved characteristics, notably, a tender and flaky crust and enhanced flavor.

We have discovered that a powdered shortening composition comprising the dried product of an emulsion of a shortening fat in natural buttermilk containing its original phospholipoids, butter fat and protein in substantially their natural intimate relation, produces a number of new and unexpected results which are highly advantageous.

In making a dried shortening, it is customary to first prepare an emulsion of the shortening fat in a liquid which does not include buttermilk, and then dry the same. The effectiveness of the dried product appears to depend to a considerable extent upon thorough dispersion of the shortening fat, and complete stability of the emulsion. A satisfactory emulsion may be produced by adding suitable emulsifying agents, but this procedure involves (1) a separate operation, (2) careful control of the amount and character of emulsifying agent, and (3) mechanical incorporation of the agent which we believe can never be as effective as when the agent is present and dispersed in the natural manner in which it is found in the original buttermilk. Our results show that when shortening fat is emulsified in buttermilk, which includes a substantial amount of its original lecithin, an appreciably improved emulsion is obtained.

The butter fat in natural buttermilk, although present in relatively small amount, appears to contribute substantially to better results. The addition of butter fat to compositions which do not include buttermilk has been heretofore suggested, but we believe that the mechanical distribution of the added butter fat does not produce the best results for the same reasons above explained in connection with the emulsifying agent.

In the dried shortening product, the proteins, casein, lacto albumin and lacto globulin forms a protective film or envelope about the finely divided particles of shortening fat. The proteins are in intimate relation with the butter fat and phospholipoids and appear to be either physically or chemically combined therewith in a state natural to the buttermilk. Consequently, the phospholipoids are active to instantly rupture the protein envelope and assist in solubilizing the same to free the shortening fat. In addition to dispersing the released shortening fat, the active phospholipoids also appear to finely distribute the butter fat in the dough and hence in the baked goods. This is evidenced by the desirable flavor of the baked goods and the tender and flaky crust for example in the case of bread, biscuits, muffins, waffles and pancakes.

In carrying out the invention, an emulsion is prepared from about 2000 pounds of about 15 per cent condensed natural buttermilk and about 600 pounds of shortening fat. If desired, about four pounds of a hydrophilic agent such as ammonium alginate may be added to increase water retention in the baked goods. The emulsion is preferably, but not necessarily homogenized or treated in a colloid mill and then in suitably heated condition of about 150° F. to 160° F. is introduced to a drier of the atomizing type such as a spray drier where it is dried to a powder at a temperature of about 150° F. to 200° F. The identity of the buttermilk constituents, i. e., the beneficial properties of the intimately associated constituents of the buttermilk apparently are preserved or improved by the treatment and a free-flowing, non-greasy, highly active, dry powder shortening is obtained.

The edible shortening fats or oils which are employed may be liquid materials, semi-solid materials or those which are solid at room temperature, either natural or chemically produced such as by hydrogenation. The oils may be cottonseed oil, corn oil, peanut oil, sun-flower or other edible oils; the semi-solid fats may be lard, butter, margarine or the like; the solid fats may be animal fats or they may be the liquid oils previously mentioned which have been hydrogenated. Or they may be hydrogenated soybean oil, hydrogenated fish oil, sperm oil or the like; in addition, the fats may be composed of any combination of the oils, semi-solid or solid fats. Other shortening materials than those recited may be used. The term "shortening fat" in the claim is intended to include materials of the character just described and suitable for shortening purposes.

The hydrophilic agents employed are Irish moss, alginates, salts of algin, agar-agar, gum acacia, gum arabic, gum tragacanth or like materials which tend to swell in the presence of moisture. Such hydrophilic agents are used in amount of about 0.1 to 0.6 per cent based on the dry weight of the product. Other agents than here described may be utilized.

The proportions of buttermilk to shortening fat may be varied within wide limits as, for instance, products having from about 33 per cent to about 90 per cent shortening fat may be produced due to the stability of the buttermilk emulsion.

If desired, sugar and salt may be included in the emulsion in appropriate amounts.

We claim:

A dry powdered shortening composition comprising minute particles of edible shortening encased in envelopes of natural buttermilk solids, said envelopes including milk fat, protein and phospholipoids in their original intimate relation, the protein forming a protective surface about the shortening fat and the phospholipoids being active to promote substantially instant rupture and solubility of the protein envelopes to free the shortening fat and finely distribute the butter fat in the baking operation.

GERALD C. NORTH.
ALVIN J. ALTON.
LAWRENCE LITTLE.